June 27, 1967 L. R. WALLER 3,327,903
MATERIAL DISPENSER WITH AN AGITATOR AND A DISCHARGE ASSISTANT
Filed Aug. 10, 1965
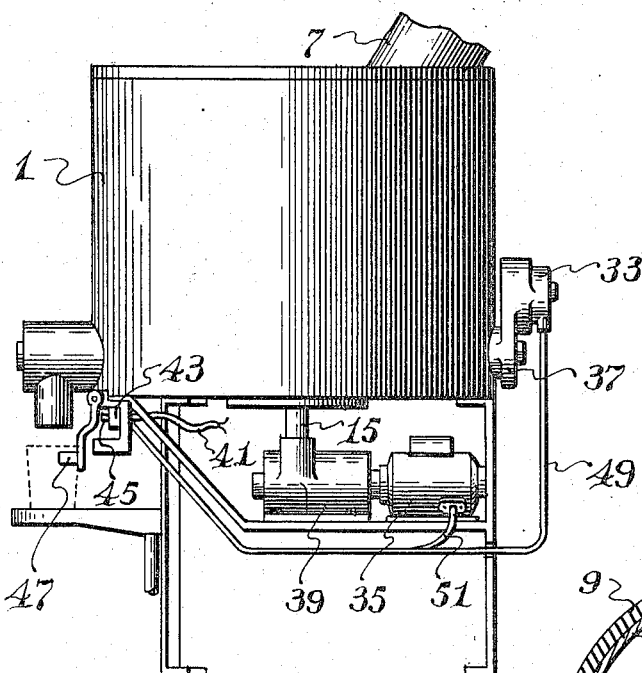
Fig. 1
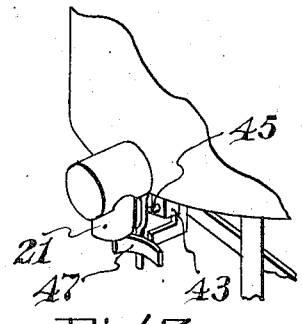
Fig. 3
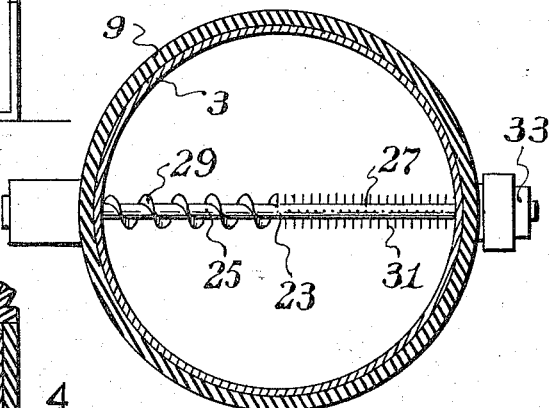
Fig. 4
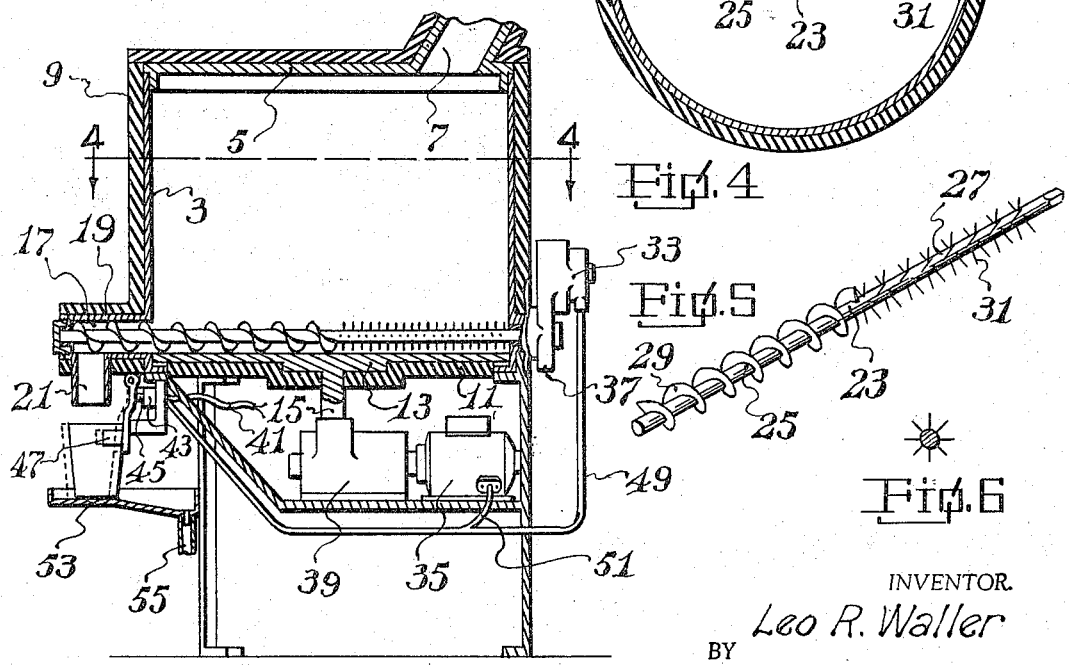
Fig. 2
Fig. 5
Fig. 6
INVENTOR.
Leo R. Waller
BY Young & Thompson
ATTORNEYS 3,327,903
MATERIAL DISPENSER WITH AN AGITATOR AND
A DISCHARGE ASSISTANT
Leo R. Waller, 1229 N. Rosedale Ave.,
Tulsa, Okla. 74127
Filed Aug. 10, 1965, Ser. No. 478,608
1 Claim. (Cl. 222—227)

The present invention relates to material dispensers with discharge assistants, more particularly of the type in which a conveyor is positioned in the bottom of a container to aid in the discharge of material from the container.

It is an object of the present invention to provide such a dispenser in which the discharge by the conveyor is facilitated.

Another object of the present invention is the provision of such dispenser which is especially well adapted to discharge material that compacts easily, such as crushed ice or the like.

Finally, it is an object of the present invention to provide such a dispenser which will be relatively simple and inexpensive to manufacture, easy to operate, maintain and repair, and rugged and durable in use.

Other objects and advantages of the present invention will become apparent from a consideration of the following description, taken in connection with the accompanying drawing, in which:

FIGURE 1 is a side elevational view of a dispenser according to the present invention;

FIGURE 2 is a view from the same position as FIG. 1 but showing the dispenser in section;

FIGURE 3 is a fragmentary perspective view of the discharge portion of the dispenser;

FIGURE 4 is a vertical sectional view taken on the line 4—4 of FIG. 2;

FIGURE 5 is a perspective view of the shaft of the present dispenser; and

FIGURE 6 is a cross-sectional view through the right-hand portion of the shaft shown in FIG. 5.

Referring now to the drawing in greater detail, there is shown a container indicated at 1, comprising a generally cylindrical body 3 having an upright axis and a generally circular cover 5 that fits on body 3. A chute 7 extends through cover 5 for the introduction of chipped or crushed ice or other solid material to be dispensed into body 3 of container 1. Body 3 and cover 5 and chute 7 are covered with a suitable insulating material 9 when the material to be dispensed is at a temperature other than ambient, such as the temperature of ice.

Container 1 is also provided with a bottom 11. A portion of bottom 11 is comprised by a horizontal circular disc 13. A vertical shaft 15 is integral with and depends from the underside of disc 13.

A discharge opening 17 extends from a lower side portion of container 1. Discharge opening 17 is bounded by a horizontal leg 19 that terminates outwardly in a depending leg 21 that is open at its bottom, and it is through leg 21 that the dispensed material finally leaves the container.

A discharge assistant is provided, in the form of a shaft 23. The discharge assistant is comprised of two portions: a conveyor in the form of a screw conveyor 25 that occupies approximately half the length of shaft 23, and an agitator 27 that occupies approximately the other half of shaft 23. Screw conveyor 25 is characterized by the usual helical flight 29 secured to shaft 23, while agitator 27 is comprised of conventional tines 31 that extend radially outwardly from shaft 23 and are spaced apart peripherally and axially about and along the portion of shaft 23 which is occupied by agitator 27.

Shaft 23 is horizontally mounted in container 1 and is journaled for rotation about its axis by means of horizontal bearings at its ends, the bearing shown at the right side of FIG. 2 being disposed in a side wall of body 3, and the bearing shown at the left side of FIG. 2 being disposed in the outer end of leg 19. Flight 29 extends into leg 19, and the point of closest approach of flight 29 and tines 31 to each other is preferably in the immediate vicinity of, and more preferably directly above, the axis of shaft 15.

A motor 33 is provided for rotating shaft 23 about its horizontal axis, and a motor 35 is provided for rotating shaft 15 about its vertical axis. Motors 33 and 35 are drivingly connected with their shafts 23 and 15, respectively, through gear reductions 37 and 39, respectively, so that the shafts 23 and 15 can be rotated at desired rates. Electrical energy for the operation of motors 33 and 35 is provided by a conductor 41 from a source of electrical power (not shown), the control of the current being effected by a normally open switch 43 provided with an operating button 45. A switch operator in the form of a pivoted yoke 47 depends from container 1 and is adapted to be moved by contact with a glass or other container to receive the dispensed material, to close the circuits through conductors 49 and 51 to motors 33 and 35, respectively.

When the material to be dispensed is ice or other wet or melting material, a catch tray 53 is desirably positioned under leg 21, and a drain 55 provides for removing spilled or dripping liquid.

In operation, the person desiring to use the dispenser places a glass or other container against the yoke 47 and pushes. This closes switch 43, completing the circuit to motors 33 and 35, which operate to rotate shafts 23 and 15, respectively. Flight 29 is so wound and motor 33 rotates shaft 23 in a direction such that screw conveyor 25 conveys material from right to left as seen in FIGS. 2 and 4. Screw conveyor 25 thus moves material from within container 1 through horizontal leg 19, whence the material falls through depending leg 21 into the receptacle, for as long as motors 33 and 35 operate or as long as there is any remaining supply of material to be dispensed.

Meanwhile, two other things have been happening: disc 13 has been rotating in its plane, so that material lying on disc 13 has been progressively crowded against one side of screw conveyor 25. For this purpose, it makes little or no difference in which direction disc 13 turns, as shaft 23 is preferably diametral of disc 13. Also at the same time, the tines 31 have been rotating with their associated portion of shaft 23, and have been breaking up the material adjacent them. This broken-up material is then carried by the disc 13 horizontally through 180° of arc until it is presented to screw conveyor 25. The agitator 27 thus serves to break up material which is then carried in a semi-circular arc to the screw conveyor that is coaxial and unitary with the agitator. It is believed that this is the first time in the dispensing art that material has been carried through this path from the agitator to the discharge assistant.

It will therefore be evident that it is desirable to position the screw conveyor substantially entirely to the opposite side of the axis of rotation of disc 13 from the agitator.

Dispensing thus continues as long as yoke 47 is pressed back. When yoke 47 is released, spring means (not shown) may move it clockwise as seen in FIGS. 1 and 2, to the extent that operating button 45 is released and switch 43 opens, whereupon motors 33 and 35 stop and dispensing ceases.

From a consideration of the foregoing disclosure, therefore, it will be evident that all of the initially recited objects of the present invention have been achieved.

Although the present invention has been described and illustrated in connection with a preferred embodiment, it is to be understood that modifications and variations may be resorted to without departing from the spirit of the invention, as those skilled in this art will readily understand. For example, various types of conveyors and agitators may be provided other than those shown in the drawing. Such modifications and variations are considered to be within the purview and scope of the present invention as defined by the appended claim.

Having described my invention, I claim:

A dispenser comprising a container having a bottom, a first electric motor disposed beneath said bottom for rotating the bottom about an upright axis, a conveyor in the container above but close to and generally parallel to said bottom, the conveyor comprising a horizontal shaft mounted for rotation in and relative to the container and extending diametrically across the container and container bottom, the shaft on one side of said upright axis having a conveyor screw thereon, the shaft on the other side of said upright axis having a plurality of tines mounted on and extending outwardly therefrom, a second electric motor for rotating said shaft and disposed on the side of said container, supporting structure for the container including a shelf, said shelf supporting said first motor, the container having a discharge opening adjacent the end of the shaft that bears the conveyor screw, and means disposed beneath said discharge opening and movable in response to pressure from a container for actuating both of said motors simultaneously, the tines on the shaft agitating and separating the material to be discharged so that half the container bottom carries the agitated and separated material about a semicircle from the tines to one side of the conveyor screw, the other half of the container bottom carrying material to be agitated and separated from the other side of the conveyor screw about an arc to the tines.

References Cited

UNITED STATES PATENTS

| | | | |
|---|---|---|---|
| 1,702,341 | 2/1929 | Gillespie | 222—240 |
| 1,943,515 | 1/1934 | Davis | 222—241 |
| 2,786,609 | 3/1957 | Isserlis | 222—227 |
| 2,991,870 | 7/1961 | Griffith et al. | 222—241 X |
| 3,036,737 | 5/1962 | King et al. | 222—227 X |
| 3,174,651 | 3/1965 | Strite | 222—240 X |
| 3,196,628 | 7/1965 | Reynolds | 141—361 X |
| 3,197,083 | 7/1965 | Elliott et al. | 222—231 |

FOREIGN PATENTS 383,773    10/1922    Germany.

WALTER SOBIN, *Primary Examiner.*